UNITED STATES PATENT OFFICE.

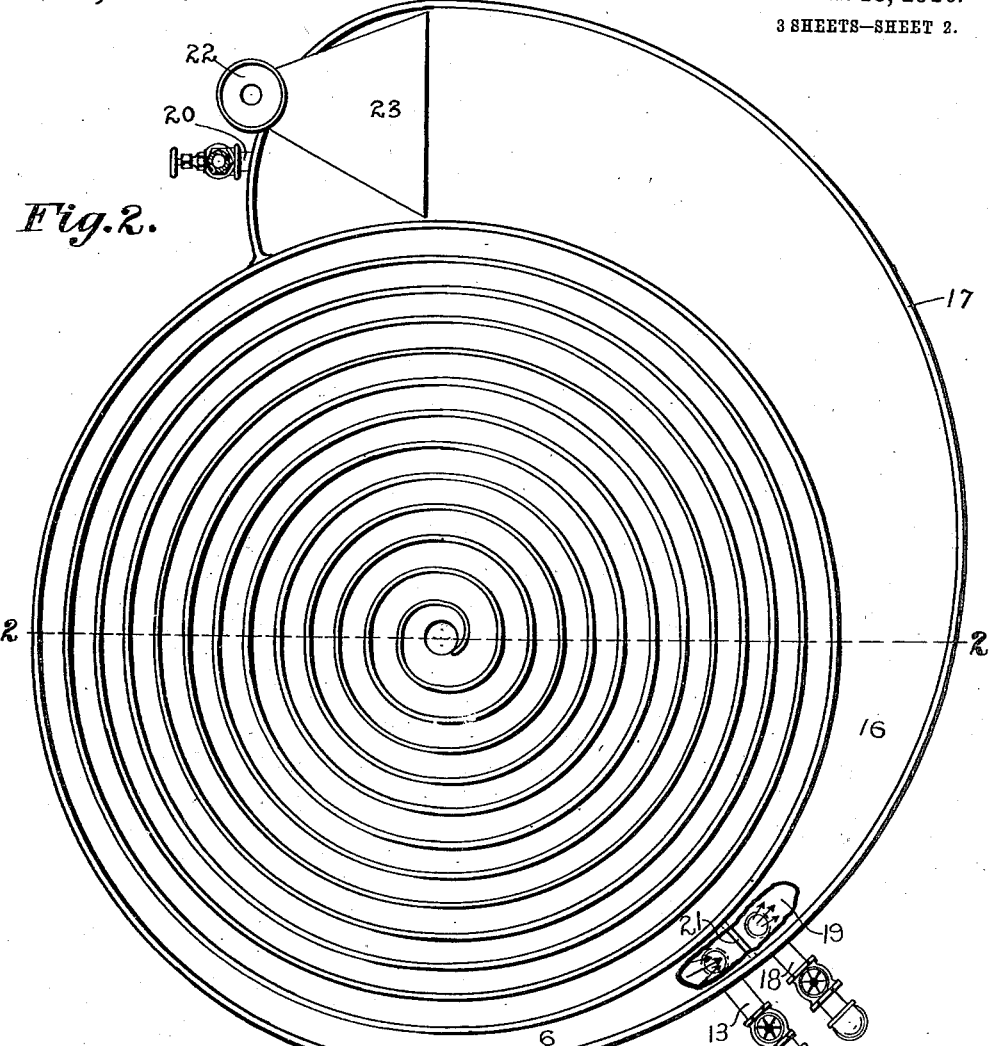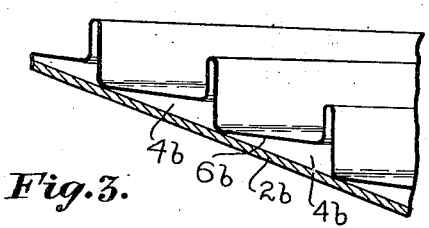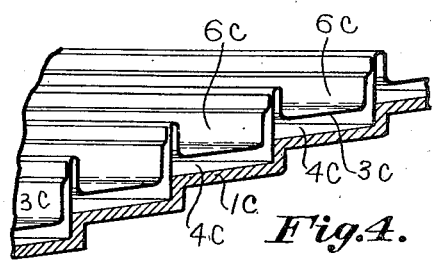

HENRY E. WEBER, OF CANTON, OHIO.

PASTEURIZING APPARATUS.

951,893.  Specification of Letters Patent.  Patented Mar. 15, 1910.

Application filed August 20, 1909.  Serial No. 513,860.

*To all whom it may concern:*

Be it known that I, HENRY E. WEBER, a citizen of the United States, residing at Canton, in the county of Stark and State of Ohio, have invented an Improvement in Pasteurizing Apparatus, of which the following is a specification.

For properly pasteurizing milk, it is desirable, if not necessary, to quickly heat the same to a temperature of about 140° F., then to hold the milk uniformly and continuously at this temperature for a period of some eighteen to twenty minutes, and finally to quickly cool the milk to a temperature of about 35° F.

The present invention relates to a stationary apparatus by which this process can be performed in a highly efficient manner and without the use of machinery or movable parts.

The general purpose of the improvement is to heat and cool the milk by fluid or liquid heating and cooling mediums through an intervening wall of thin sheet metal, and this object is attained by providing a series of two or more alternately concave and convex cone-shaped or dome-shaped pans having upright spiral flanges therein forming endwise-inclined spiral troughs in which the milk is adapted to flow, and by providing corresponding ducts in the bottoms of the pans underneath the troughs, with thin sheet metal walls between the ducts and the troughs, in which ducts the heating or cooling medium is adapted to flow, preferably in the direction opposite to the flow of the milk. A preferred arrangement of an apparatus embodying this general idea, together with several modified forms of details, are illustrated in the accompanying drawings, forming part hereof, in which—

Figure 1:
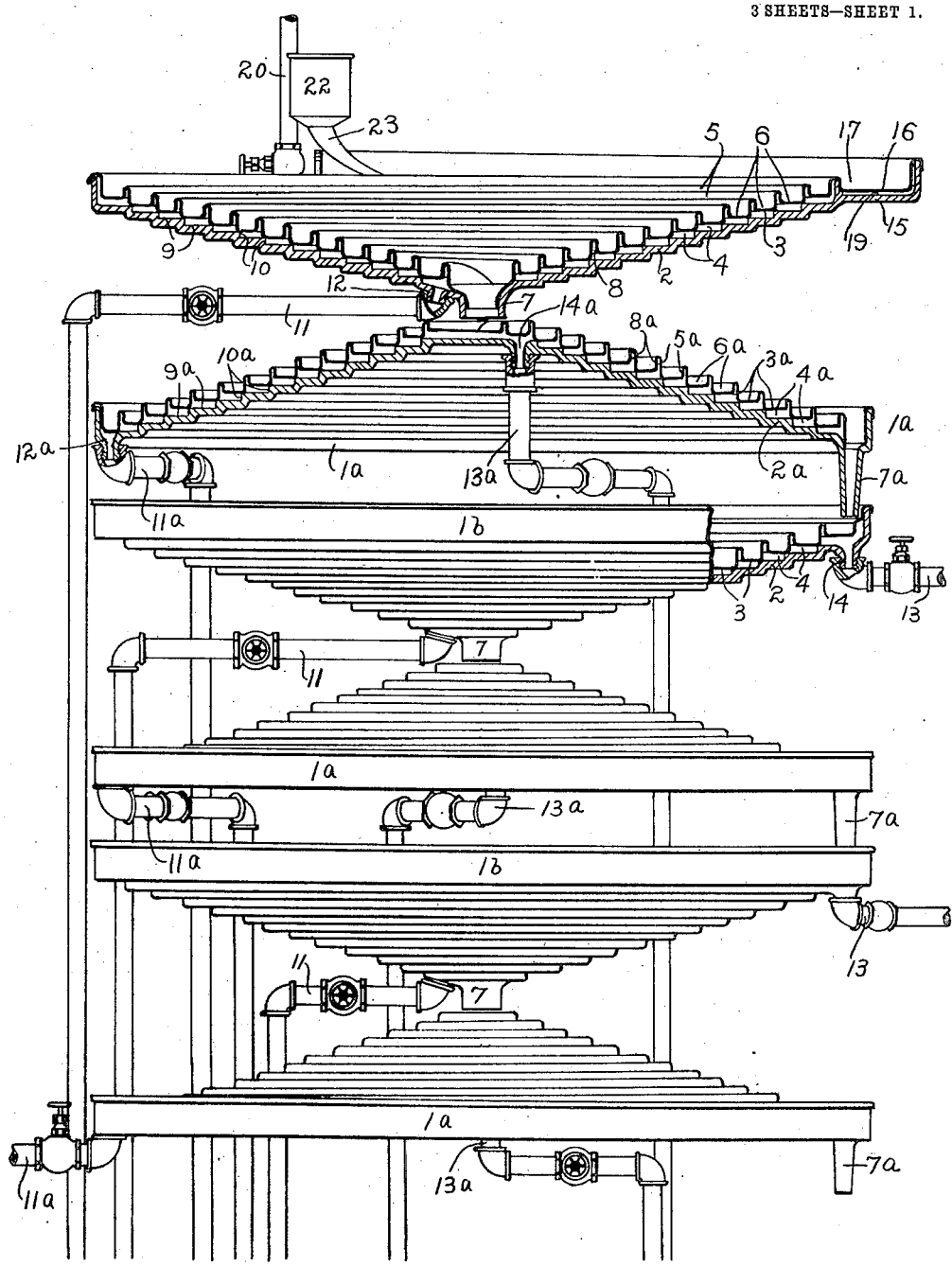
Figure 5:
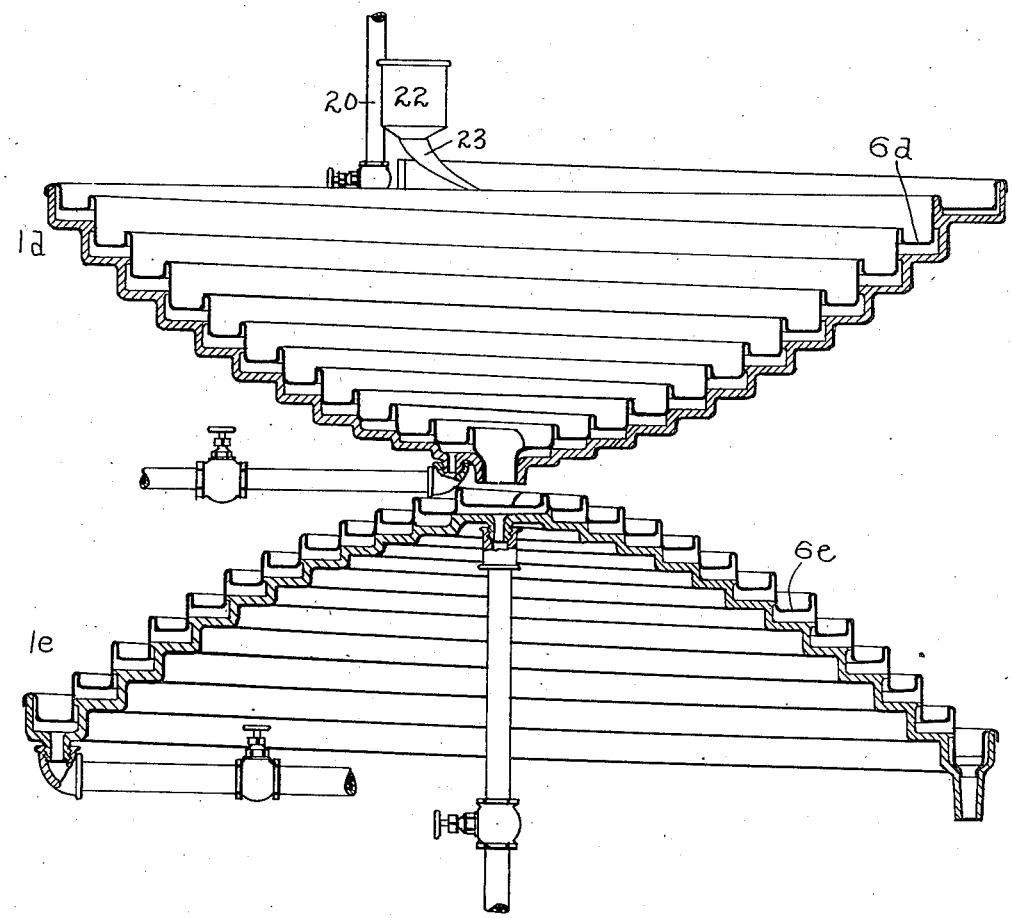

Figure 1 is a side elevation of the apparatus showing the two upper spiral troughs in cross section on line 2—2, Fig. 2; Fig. 2, a plan view of the top or initial trough; Fig. 3, a fragmentary enlarged section showing a modified method of making the spiral trough; Fig. 4, a fragmentary section showing another modified form of making the same; and Fig. 5, an elevation section showing an apparatus composed of two dome-shaped pans.

Similar numerals refer to similar parts throughout the drawings.

The apparatus, as shown in Figs. 1 and 2, includes a series of alternately concave and convex cone-shaped pans 1, 1$^a$ and 1$^b$, arranged in a vertical tier, and each pan is provided with a double bottom composed of the two walls 2 or 2$^a$ and 3 or 3$^a$, between which walls is provided the spiral duct 4 or 4$^a$, in which the heating or cooling medium is adapted to flow.

The lower bottom is preferably pressed or cast of metal having sufficient strength and thickness to form a substantial frame for the pan, and to prevent a conduction of heat from or to the heating or cooling medium; and the upper wall is made of thin sheet metal through which the heat of the heating medium or of the milk is readily conducted.

The upper thin bottom of each pan is provided with an upright spiral flange 5 or 5$^a$, forming in each case the spiral trough 6 or 6$^a$ which is gradually inclined downward from the periphery to the center of the concave pans and from the center to the periphery of the convex pans, in which troughs the milk is adapted to flow by gravity. The respective pans are provided with the central or peripheral outlets 7 or 7$^a$, through the openings of which the trough of each pan is adapted to discharge into the upper end of the trough of the pan next below. The spiral flange is preferably made by crimping or corrugating the sheet metal, as shown in Fig. 1, and the resulting walls of the flange are preferably spaced slightly apart, thus forming the channel 8 or 8$^a$ extending upward from and communicating with the adjacent duct. The bottoms of the troughs are preferably formed flat and are also preferably laterally inclined upward and outward, thus resisting the centrifugal force of the flowing milk and causing the same to fill the channel in substantially uniform depth throughout its width.

The lower thick bottom of each pan is preferably shaped to present the spiral flat face 9 or 9$^a$ opposite and adjacent to the bottom of each trough, thus forming the intervening duct 4 or 4$^a$; and the spiral shoulders 10 or 10$^a$ thus formed on the lower wall provide a suitable support for the corresponding angle at one side of the bottom of the spiral trough, the abutment of which angle with the shoulders serves to substantially separate the adjacent sections of the spiral duct. It will be understood, however, that it is not essential to make an impervious joint at this juncture, for the reason that such portion of the liquid heating or cooling medium as may seep through a loose joint will not be sufficient to materially affect the normal flow of the bulk of the same longitudinally along the duct.

The inlet pipe 11 for each concave pan communicates with the lower inner end of the spiral duct as at 12, and the outlet pipe 13 for the same pan leads from the upper outer end of the duct as at 14; while the inlet pipe 11ª for each convex pan communicates with the lower end of the duct as at 12ª, and the outlet pipe 13ª for the same pan leads from the inner upper end of the duct as at 14ª. The respective pipes of the four upper heating pans, preferably the four upper pans, are connected with a suitable reservoir, as a hot water boiler, not shown, and the heating liquid is thus caused to flow through the respective inlet pipes, thence upward through the spiral groove and thence through the outlet pipes, either by natural circulation or by the use of pumps, not shown, as may be desired. The inlet and outlet pipes of the cooling pans are similarly connected with a suitable cold water or brine reservoir, and the flow of cooling liquid is arranged to pass upward through the duct in each pan.

The walls of the upper or initial heating pan are provided with the peripheral extensions 15 and 16 by which is formed the receiving trough 17, the flat channel of which is made quite wide at its rear end, from which it is gradually tapered in width to its forward end where it opens into or merges with the spiral trough 6 of the upper pan. The steam inlet pipe 18 communicates with the forward end of the wide duct 19 which is formed between the walls of the bottom of the receiving trough, and the steam outlet pipe 20 leads from the rear end of this duct. The transverse partition 21 separates the steam duct of the receiving trough from the hot water duct of the upper pan.

Milk is received into the hopper 22 which is provided with the wide-mouthed nozzle 23 which is adapted to discharge the milk in a wide stream into the rear end of the receiving trough, whence the milk spreads out in a thin film over this trough and flows along the same and on along the trough 6 in the upper concave pan, and thence through the several outlets and along the troughs of each succeeding pan. The steam passes through the duct of the receiving trough in the opposite direction from the flow of the milk, and is arranged to quickly heat the same to a temperature of about 140° F., by the time the milk reaches the ordinary trough 6 of the upper pan. The hot water which flows through the duct of this pan and the ducts of each succeeding heating pan is maintained at such a temperature as to continuously and uniformly keep the milk at a temperature of about 140° F., at all times. And finally, the cold water or brine which flows through the duct or ducts of the lower pan or pans, quickly cools the milk to a temperature near to freezing, say about 35° F., thus completing the process and giving at all times a certain and positive control over each feature thereof.

It is evident that when the milk spreads out and flows in a thin film along the wide flat channel of the receiving trough, the same is suddenly heated to the required initial temperature of say 140° from the steam in the corresponding duct by conduction through the thin intervening wall forming the bottom of the trough; and that when the steam flows upward in the direction opposite to the flow of milk, the most efficient method of heating by convection is accomplished. And, likewise, as the milk proceeds on through the successive troughs of the heating pans, it flows in a comparatively shallow stream of uniform depth on the flat and transversely inclined bottoms of the troughs, thus bringing each particle of milk in close contact with the heating bottoms of the troughs; and as the hot water flows upward preferably in a direction the reverse of the flow of milk, the agitation of the moving water brings all its particles successively in contact with the heat-conductive walls of the duct which form the bottom and sides of the milk troughs, thus heating them by convection in the most efficient manner. It will be understood that the flowing motion of the milk along the troughs causes all the particles thereof to successively come in contact with the heated bottom or side walls of the trough, thus keeping the whole body of the milk uniformly and continuously heated by convection to the required temperature of about 140° during the whole period the milk is flowing through the heating pans, which are so arranged that the flow of milk through them will require the desired period of some eighteen to twenty minutes. And finally, the milk is suddenly and uniformly cooled in the same manner by flowing through the troughs of the lower pans, by the use of a liquid cooling medium in the ducts thereof instead of a heating medium.

Certain modified methods of making the bottoms of the pans are illustrated in Figs. 3 and 4. In the first modified form, a plain lower bottom 2ᵇ is used on which the angles of the bottoms of the spiral troughs 6ᵇ are adapted to rest, thus separating the respective ducts 4ᵇ from each other, which arrangement gives these ducts a triangular cross section instead of the rectangular shape as shown in Fig. 1; and in the second modified form, each trough 6ᶜ is shown to be made out of a separate strip of sheet metal 3ᶜ, the respective edge portions of which may be riveted to the lower wall 1ᶜ or soldered to the adjacent trough, as shown in the figure; and the troughs are preferably shaped so that the duct 4ᶜ will extend upward on each side of the trough as well as across the bottom thereof. And in Fig. 5, the pan troughs 6ᵈ and 6ᵉ are arranged with an equal rate of longitudinal inclination throughout their length, thus giving the jaws 1ᵈ and 1ᵉ a dome shape instead of the cone shape shown in the other figures. By this arrangement, the rate of the flow of milk is kept substantially constant at all times throughout the different parts of the respective pans, which serves to prevent any excessive accumulation or overflowing of the milk at any stage of the process.

It is evident that it is not always essential to form the several troughs with flat bottoms or to laterally incline the same upward and outward, nor is it always necessary to extend the ducts for the respective troughs upward into the several flanges thereof; and furthermore, under certain conditions, the heating or cooling fluid or liquid can be caused to flow in the same direction as the flow of milk, but it is preferred to employ the specific features of construction and operation set forth herein, to obtain the best control and the most efficient performance of the pasteurizing process. Neither is it necessary to make the receiving trough spiral or integral with the upper pan, nor to begin at the top of the tier with a concave pan, but, this arrangement is convenient for facilitating the continuous flow of milk from the receiving pan. Furthermore, it is not essential to arrange the troughs spirally in concave and convex pans, but such arrangement not only facilitates the uniform and continuous flow of the milk and the heating and cooling mediums, but also serves to economize space and conserve the heat by the use of a common partition between the sides of the successive sections of the troughs and ducts.

I claim:

1. A pasteurizing apparatus including a tier of pans having upright flanges therein forming endwise-inclined troughs, corresponding ducts in the bottoms of the pans underneath the troughs, with heat-conductive walls intervening between the ducts and the troughs, means for flowing a heating liquid upward through the ducts of one or more of the upper pans, and means for flowing a cooling liquid upward through the ducts of one or more of the lower pans.

2. A pasteurizing apparatus including a tier of pans having upright flanges therein forming endwise-inclined troughs, corresponding ducts in the bottoms of the pans underneath the troughs, with heat-conductive walls intervening between the ducts and the troughs, means for flowing a heating liquid through the ducts of one or more of the upper pans, and means for flowing a cooling liquid through the ducts of one or more of the lower pans.

3. A pasteurizing apparatus including a tier of pans having upright spiral flanges therein forming endwise-inclined spiral troughs, corresponding ducts in the bottoms of the pans underneath the troughs, with heat-conductive walls intervening between the ducts and the troughs, the bottoms of the troughs being formed flat and laterally inclined upward and outward and the trough of each pan having an outlet leading into the upper end of the pan-trough next below.

4. A pasteurizing apparatus including a tier of pans having upright spiral flanges therein forming endwise-inclined spiral troughs, corresponding ducts in the bottoms of the pans underneath the troughs, with heat-conductive walls intervening between the ducts and the troughs, the bottoms of the troughs being formed flat, and the trough of each pan having an outlet leading into the upper end of the pan-trough next below.

5. A pasteurizing apparatus including a tier of pans having upright spiral flanges therein forming endwise-inclined spiral troughs, corresponding ducts in the bottoms of the pans underneath the troughs, with heat-conductive walls intervening between the ducts and the troughs, the trough of each pan having an outlet leading into the upper end of the pan-trough next below.

6. A pasteurizing apparatus including a tier of pans having upright spiral flanges therein forming endwise-inclined spiral troughs, corresponding ducts in the bottoms of the pans underneath the troughs and extending upward into the flanges, with heat-conductive walls intervening between the ducts and the troughs, the trough of each pan having an outlet leading into the upper end of the pan-trough next below.

7. A pasteurizing apparatus including a tier of alternately concave and convex pans having upright flanges therein forming endwise-inclined troughs, corresponding ducts in the bottoms of the pans underneath the troughs, with heat-conductive walls intervening between the ducts and the troughs, the trough of each pan having an outlet leading into the upper end of the pan-trough next below.

8. A pasteurizing apparatus including a tier of pans having upright spiral flanges therein forming endwise-inclined spiral troughs, corresponding ducts in the bottoms of the pans underneath the troughs, with heat-conductive walls intervening between the ducts and the troughs, the trough of each pan having an outlet leading into the upper end of the pan-trough next below.

9. A pasteurizing apparatus including a tier of pans having upright flanges therein forming endwise-inclined troughs, corresponding ducts in the bottoms of the pans underneath the troughs, with heat-conductive walls intervening between the ducts and the troughs, the trough of each pan having an outlet leading into the upper end of the pan-trough next below.

10. A pasteurizing pan having an upright flange therein forming an endwise-inclined trough, a corresponding duct in the bottom of the pan underneath the trough, with a heat-conductive wall intervening between the duct and the trough, and means for flowing a heating or cooling fluid upward through the duct.

11. A pasteurizing pan having an upright flange therein forming an endwise-inclined trough, a corresponding duct in the bottom of the pan underneath the trough, with a heat-conductive wall intervening between the duct and the trough, and means for flowing a heating or cooling fluid through the duct.

12. A pasteurizing pan having an upright spiral flange therein forming an endwise-inclined spiral trough, a corresponding duct in the bottom of the pan underneath the trough, with a heat-conductive wall intervening between the duct and the trough, the bottom of the trough being formed flat and laterally inclined upward and outward.

13. A pasteurizing pan having an upright spiral flange therein forming an endwise-inclined spiral trough, a corresponding duct in the bottom of the pan underneath the trough, with a heat-conductive wall intervening between the duct and the trough, the bottom of the trough being formed flat.

14. A pasteurizing pan having an upright spiral flange therein forming an endwise-inclined spiral trough, a corresponding duct in the bottom of the pan underneath the trough, with a heat-conductive wall intervening between the duct and the trough.

15. A pasteurizing pan having an upright spiral flange therein forming an endwise-inclined spiral trough, a corresponding duct in the bottom of the pan underneath the trough and extending upward into the flange, with a heat-conductive wall intervening between the duct and the trough.

16. A pasteurizing pan having an upright spiral flange therein forming an endwise-inclined spiral trough, a corresponding duct in the bottom of the pan underneath the trough, with a heat-conductive wall intervening between the duct and the trough.

17. A pasteurizing pan having an upright flange therein forming an endwise-inclined trough, a corresponding duct in the bottom of the pan underneath the trough, with a heat-conductive wall intervening between the duct and the trough.

18. A pasteurizing apparatus including a heating pan, a receiving trough having an endwise-inclined channel opening into the pan, a duct in the trough underneath the channel, with a heat-conductive wall intervening between the duct and the channel, and means for flowing a heating fluid upward through the duct.

19. A pasteurizing apparatus including a heating pan, a receiving trough having an endwise-inclined channel opening into the pan, a duct in the trough underneath the channel, with a heat-conductive wall intervening between the duct and the channel, and means for flowing a heating fluid through the duct.

20. A pasteurizing apparatus including a heating pan, a receiving trough having an endwise-inclined channel opening into the pan, a duct in the trough underneath the channel, with a heat-conductive wall intervening between the duct and the channel.

21. A pasteurizing apparatus including a heating pan, a receiving trough having an endwise-inclined flat channel opening into the pan, a duct in the trough underneath the channel, with a heat-conductive wall intervening between the duct and the channel.

HENRY E. WEBER.

Witnesses:
RUTH A. MILLER,
WM. R. RHOADS.